(12) United States Patent
Klop et al.

(10) Patent No.: US 10,272,957 B2
(45) Date of Patent: Apr. 30, 2019

(54) ACTIVE TIRE SPOILER SYSTEM AND METHOD

(71) Applicant: FORD GLOBAL TECHNOLOGIES, LLC, Dearborn, MI (US)

(72) Inventors: Aaron Peter Klop, Bloomfield Hills, MI (US); Manfred Lentzen, Erftstadt (DE); Karel Chalupa, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 15/370,126

(22) Filed: Dec. 6, 2016

(65) Prior Publication Data

US 2018/0154952 A1 Jun. 7, 2018

(51) Int. Cl.
*B60R 22/00* (2006.01)
*B62D 35/00* (2006.01)
*B62D 25/08* (2006.01)
*B62D 37/02* (2006.01)
*B62D 35/02* (2006.01)

(52) U.S. Cl.
CPC ........... *B62D 35/005* (2013.01); *B62D 25/08* (2013.01); *B62D 37/02* (2013.01); *B60Y 2400/40* (2013.01); *B60Y 2400/412* (2013.01); *B62D 35/02* (2013.01); *Y02T 10/82* (2013.01); *Y02T 10/88* (2013.01)

(58) Field of Classification Search
CPC ...... B62D 35/005; B62D 25/08; B62D 24/02; B62D 35/00; B60Y 2400/40; B60Y 2400/412
USPC ........ 701/49; 293/118, 133, 102; 280/6.151; 296/180.1
See application file for complete search history.

(56) References Cited

U.S. PATENT DOCUMENTS

| | | | |
|---|---|---|---|
| 4,159,140 A | 6/1979 | Chabot et al. | |
| 4,375,898 A | 3/1983 | Stephens | |
| 4,810,022 A * | 3/1989 | Takagi | B62D 35/005 180/197 |
| 7,380,869 B2 | 6/2008 | Nakaya | |
| 7,686,382 B2 | 3/2010 | Rober et al. | |
| 7,854,469 B2 * | 12/2010 | Dayton | B62D 35/001 296/180.1 |
| 8,731,781 B2 * | 5/2014 | Prentice | B62D 35/02 296/180.1 |
| 8,950,800 B1 * | 2/2015 | Farooq | B60R 21/34 293/118 |
| 2007/0063541 A1 * | 3/2007 | Browne | B62D 35/00 296/180.1 |

(Continued)

FOREIGN PATENT DOCUMENTS

DE 102011018445 A1 10/2012
EP 1405783 B1 8/2005

OTHER PUBLICATIONS

English Machine Translation of DE102011018445A1.
English Machine Translation of EP1405783B1.

*Primary Examiner* — Shardul D Patel
(74) *Attorney, Agent, or Firm* — Jason Rogers; Vichit Chea; King & Schickli, PLLC (57) ABSTRACT

An active tire spoiler system includes a first tire spoiler, a second tire spoiler and a control module. That control module includes a controller configured to displace the first tire spoiler and the second tire spoiler between a stowed position and a deployed position. A related method is also disclosed.

9 Claims, 10 Drawing Sheets

(56) References Cited

U.S. PATENT DOCUMENTS

| | | | | |
|---|---|---|---|---|
| 2015/0149046 A1* | 5/2015 | Jeong | ................... | G01G 19/12 |
| | | | | 701/49 |
| 2015/0210324 A1* | 7/2015 | Kojima | ................ | B62D 35/005 |
| | | | | 296/180.1 |
| 2015/0232138 A1* | 8/2015 | Parry-Williams | ...... | B62D 35/02 |
| | | | | 296/180.5 |
| 2017/0088192 A1* | 3/2017 | Auden | .................. | B62D 35/00 |
| 2017/0158257 A1* | 6/2017 | Fahland | ............... | B62D 35/005 |

\* cited by examiner

ACTIVE TIRE SPOILER SYSTEM AND METHOD

TECHNICAL FIELD

This document relates generally to the motor vehicle equipment field and, more particularly, to an active tire spoiler system as well as to a method for controlling active tire spoilers.

BACKGROUND

All motor vehicles have wheels and tires that turn to create forward motion. The tires must be round in order to function. The shape of the round tire is not a good aerodynamic shape thereby causing drag when in forward motion. This drag force is increased exponentially with the increase of motor vehicle velocity.

This document relates to a new and improved active tire spoiler system that reduces the aerodynamic drag caused by the front tires of a motor vehicle. More specifically, at or above a predetermined motor vehicle velocity or speed, separate tire spoilers are deployed motor vehicle forward of the front wheels of the motor vehicle and function as rigid 3-D air deflectors to reduce the drag force caused by the wheels and tires.

SUMMARY

In accordance with the purposes and benefits described herein, an active tire spoiler system is provided. That active tire spoiler system includes a first tire spoiler, a second tire spoiler and a control module. The control module includes a controller configured to displace the first tire spoiler and the second tire spoiler between a stowed position, aerodynamically concealed behind a body panel of the motor vehicle, and a deployed position forward of the tires and wheels to reduce aerodynamic drag.

The control module may include a first actuator connected to the first tire spoiler and a second actuator connected to the second tire spoiler. Further, a first support may be provided for the first tire spoiler and a second support may be provided for the second tire spoiler. That first support may include a first guide track and the second support may include a second guide track.

A first follower for the first guide track may be provided on the first tire spoiler. A second follower for the second guide track may be provided on the second tire spoiler.

The first actuator may include a first rotary drive motor, a first jack screw rotated by the first rotary drive motor and a first nut engaged with the first drive screw and fixed to the first tire spoiler. Similarly, the active tire spoiler system may include a second actuator having a second rotary drive motor, a second jack screw rotated by the second rotary drive motor and a second nut engaged with the second jack screw and fixed to the second tire spoiler.

The first rotary drive motor may be carried on the first support. The second rotary drive motor may be carried on the second support. The first guide track may be a first elongated channel having a first T-shaped cross section. The second guide track may be a second elongated channel having a second T-shaped cross section.

The controller may be configured to (a) include a first data input for motor vehicle speed data and (b) displace the first tire spoiler and the second tire spoiler into the deployed position when the motor vehicle speed data exceeds a predetermined speed.

The controller may be configured to (a) include a second data input for ambient temperature data and (b) disable displacement of the first tire spoiler and the second tire spoiler to the deployed position when the ambient temperature data falls within a predetermined temperature range. In addition the controller may be configured to include a third data input for drive train mode status data.

In accordance with an additional aspect, a method is provided for controlling active tire spoilers for a motor vehicle. That method comprises the steps of monitoring, by a speed monitoring device, motor vehicle speed and controlling, by a control module, displacement of a first tire spoiler and a second tire spoiler between a stowed position and a deployed position in response to a current speed of the motor vehicle.

The method may further include a step of monitoring ambient temperature by a temperature monitoring device. In addition the method may include a step of disabling, by the controller, displacement of the first tire spoiler and the second tire spoiler into the deployed position in response to a current temperature falling within a predetermined range.

The method may also include the step of monitoring, by a drive train mode status monitoring device, a drive train mode status of the motor vehicle. Further, the method may include the step of disabling, by the controller, displacement of the first tire spoiler and the second tire spoiler into the deployed position in response to a current drive train mode status indicating engagement of four wheel drive in the motor vehicle.

Still further, the method may include the step of configuring the controller to include a timer. In addition, the method may include the step of configuring the controller to displace the first tire spoiler and the second tire spoiler into the stowed position in response to the motor vehicle being operated at a speed below a predetermined speed for a predetermined period of time. Further, the method may include the step of configuring the controller to displace the first tire spoiler and the second tire spoiler into the deployed position in response to the motor vehicle being operated at a speed above a predetermined speed for a predetermined period of time.

In the following description, there are shown and described several preferred embodiments of the active tire spoiler system as well as the related method for controlling active tire spoilers for a motor vehicle. As it should be realized, system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the active tire spoiler system and method and together with the description serve to explain certain principles thereof.

Reference will now be made in detail to the present preferred embodiments of the active tire spoiler system and related method for controlling active tire spoilers of a motor vehicle, examples of which are illustrated in the accompanying drawing figures.

DETAILED DESCRIPTION

Figure 1:
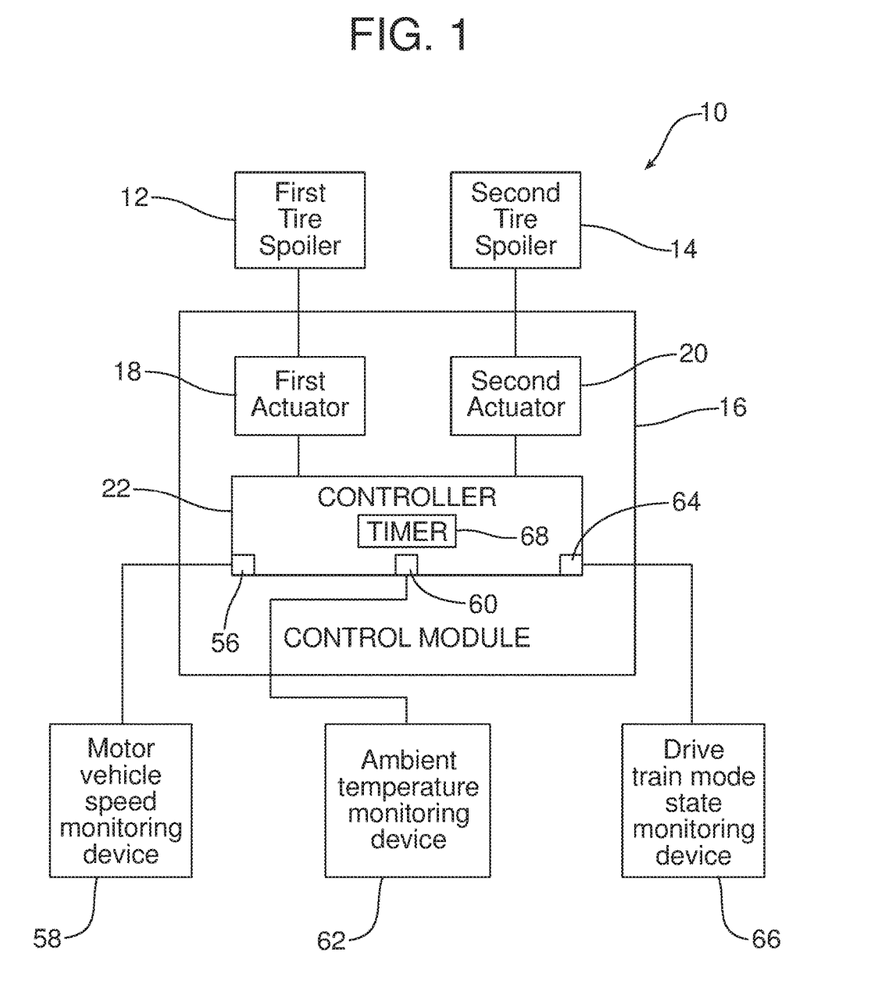
FIG. 1 is a schematic block diagram of the active tire spoiler system.

Reference is now made to FIG. 1 which schematically illustrates the active tire spoiler system 10. The active tire spoiler system 10 includes a first tire spoiler 12 and a second tire spoiler 14. The active tire spoiler system 10 also includes a control module 16. The control module 16 includes a first actuator 18, a second actuator 20 and a controller 22. The controller 22 may comprise a computing device such as a dedicated microprocessor or electronic control unit (ECU) operated in accordance with instructions from appropriate control software.

Figure 2A:
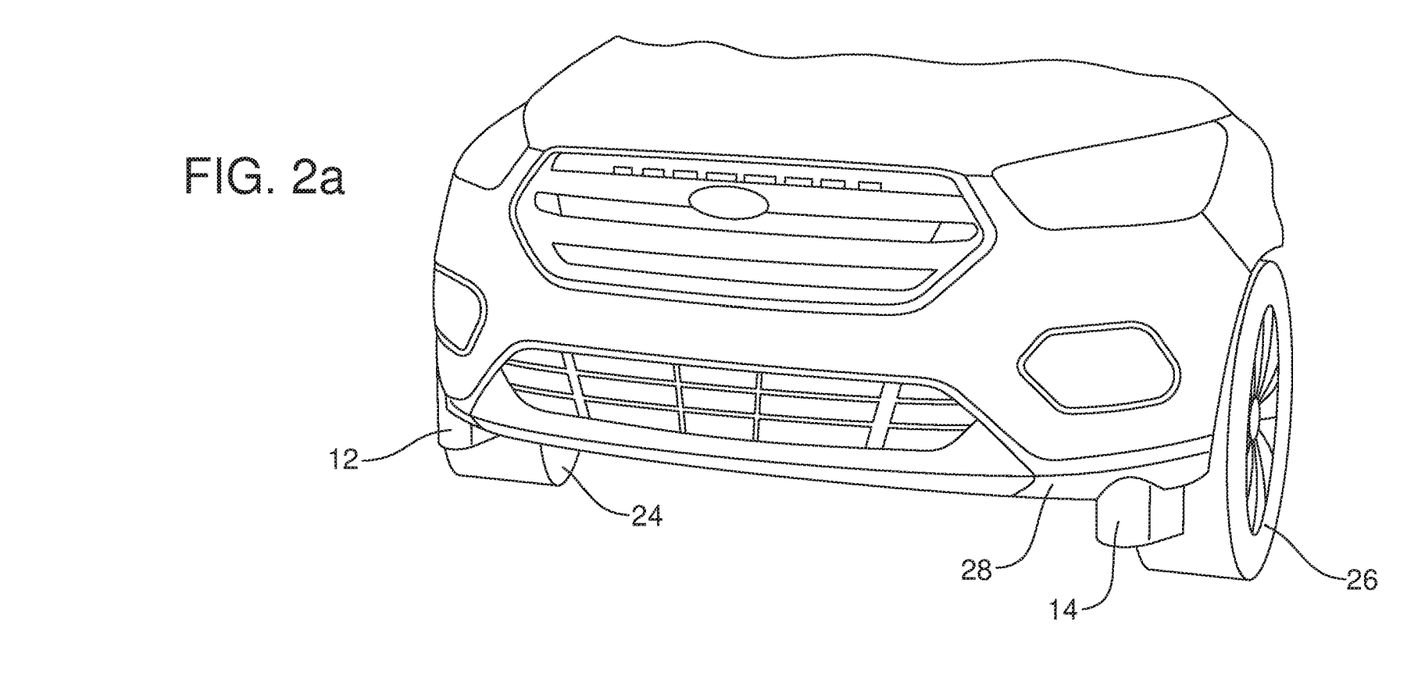
FIG. 2a is a fragmentary front elevational view of a motor vehicle equipped with the active tire spoiler system that illustrates the active tire spoiler system in the deployed position.
Figure 2B:
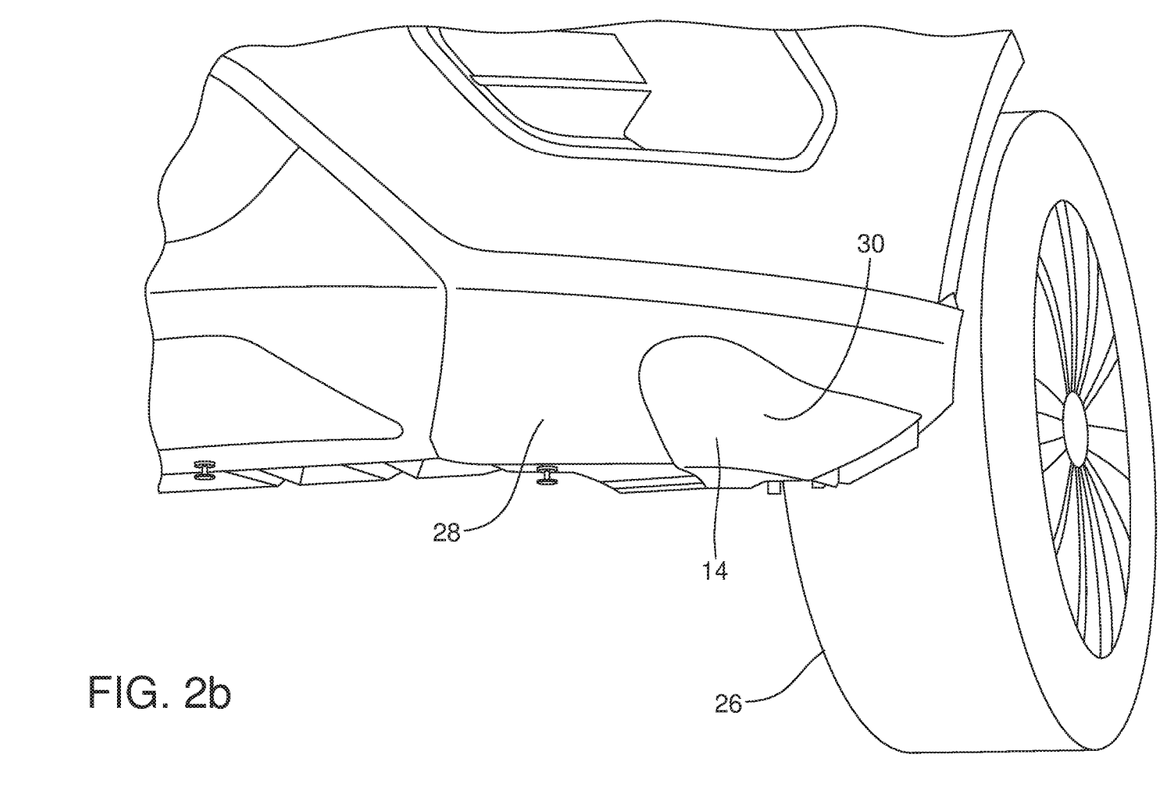
FIG. 2b is a more detailed view of one of the tire spoilers illustrated in the stowed position wherein the bottom face of the tire spoiler rests flush with the smooth aerodynamic outer surface of the at least partially surrounding fascia panel.

The controller 22 is configured to displace the first tire spoiler 12 and the second tire spoiler 14 between an extended or deployed position illustrated in FIG. 2a and a retracted or stowed position illustrated in FIG. 2b. When the first tire spoiler 12 and second tire spoiler 14 are in the deployed position illustrated in FIG. 2a, the first tire spoiler 12 and the second tire spoiler 14 are positioned motor vehicle forward of the respective first tire and wheel 24 and second front tire and wheel 26. In this position the first tire spoiler 12 and second tire spoiler 14 act as rigid three dimensional air deflectors that redirect air around the first and second tire and wheel 24, 26 thereby reducing aerodynamic drag and increasing the fuel efficient operation of the motor vehicle.

In contrast, when the first and second actuators 18, 20 are in the stowed position as illustrated with respect to the second tire spoiler 14 in FIG. 2b, the actuators are concealed behind the fascia panel 28 where they are protected from curbing and other roadway obstacles. FIG. 2b clearly illustrates how the bottom face 30 of the second tire spoiler 14 is maintained flush with the surface of the surrounding fascia panel 28 in order to improve the aesthetic appearance of the motor vehicle when the spoiler is held in the stowed position.

Figure 3A:
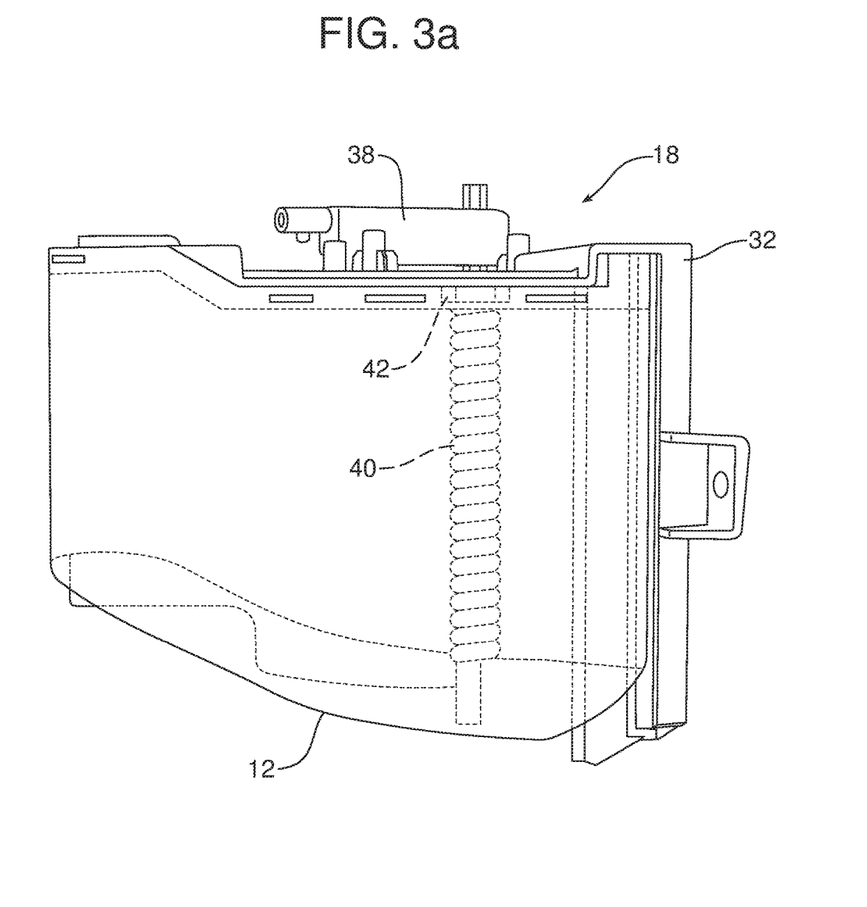
FIG. 3a is a detailed side elevational view of the first tire spoiler in the raised or stowed position.
Figure 3B:
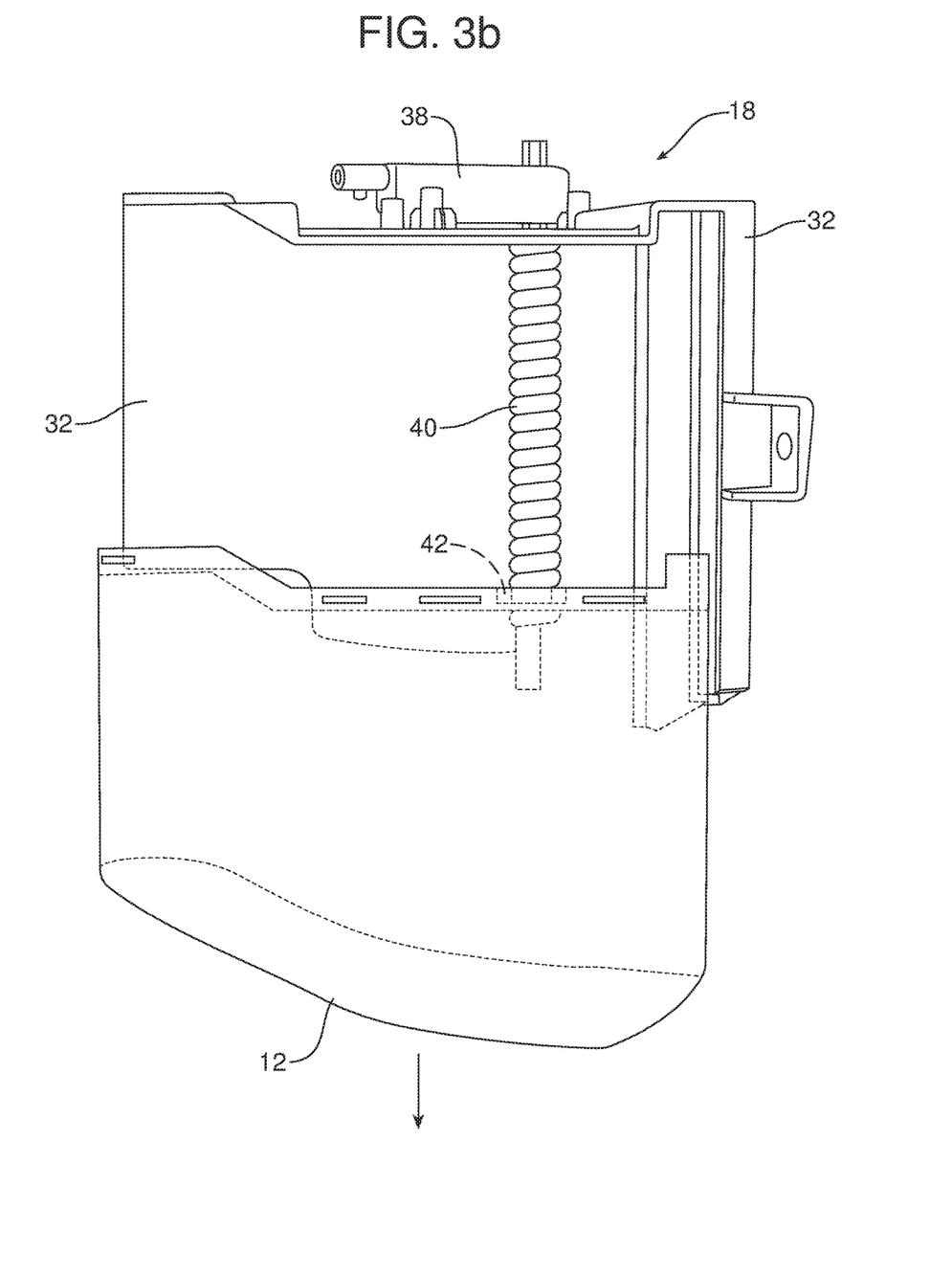
FIG. 3b is a view similar to FIG. 3a showing the first tire spoiler in the deployed position.
Figure 3C:
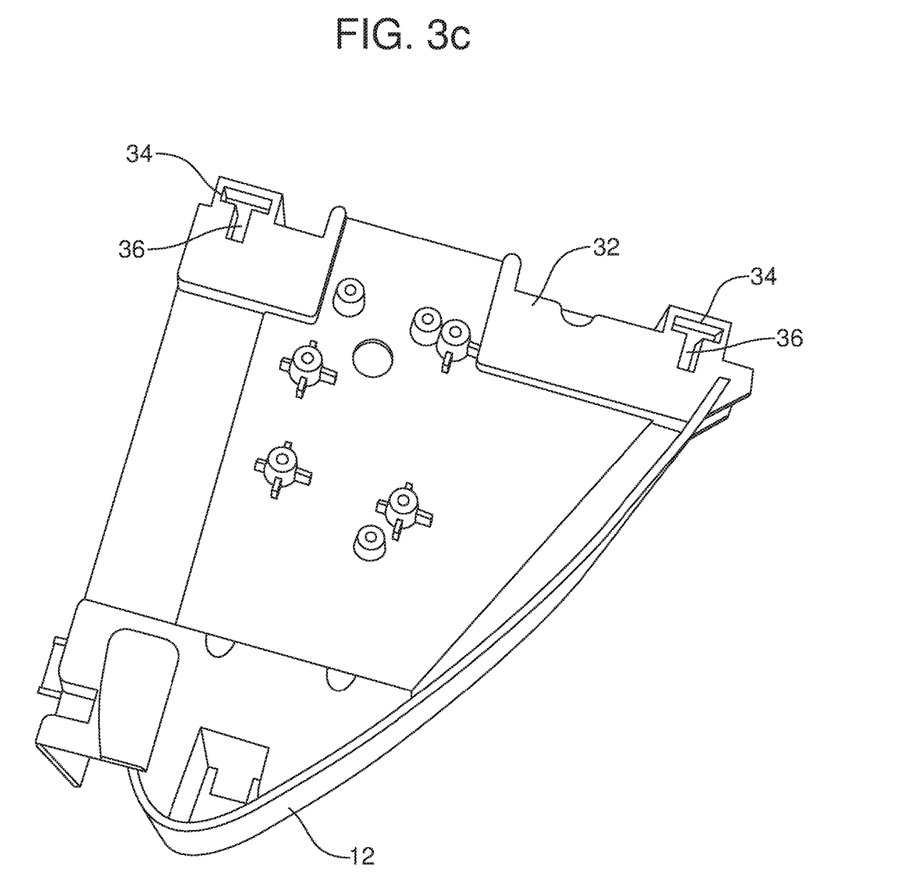
FIG. 3c is a detailed top perspective view of the first spoiler illustrating the first guide track.
Figure 3D:
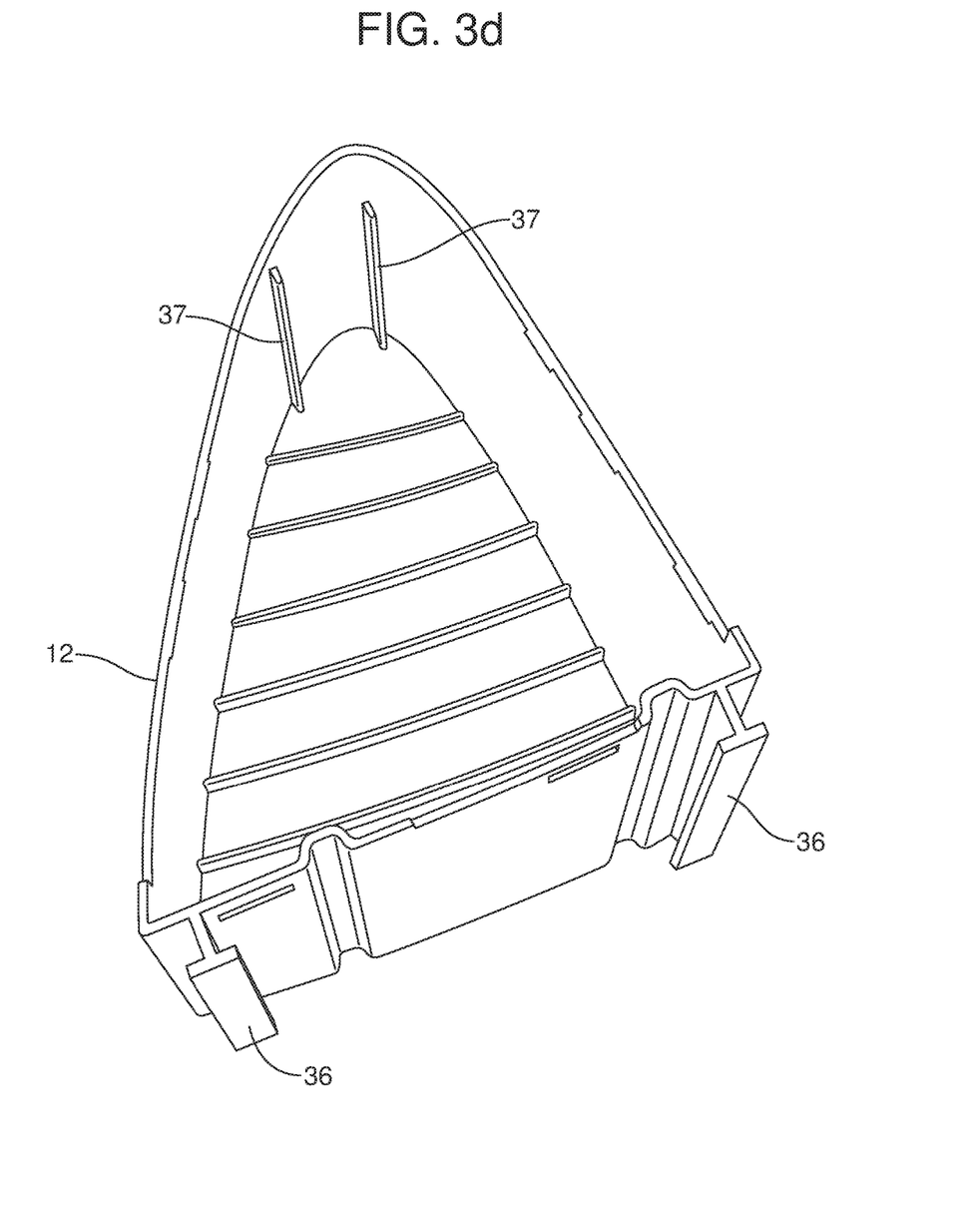
FIG. 3d is a perspective view of the inside of the first tire spoiler which is a three dimensional air deflector.
Figure 3E:
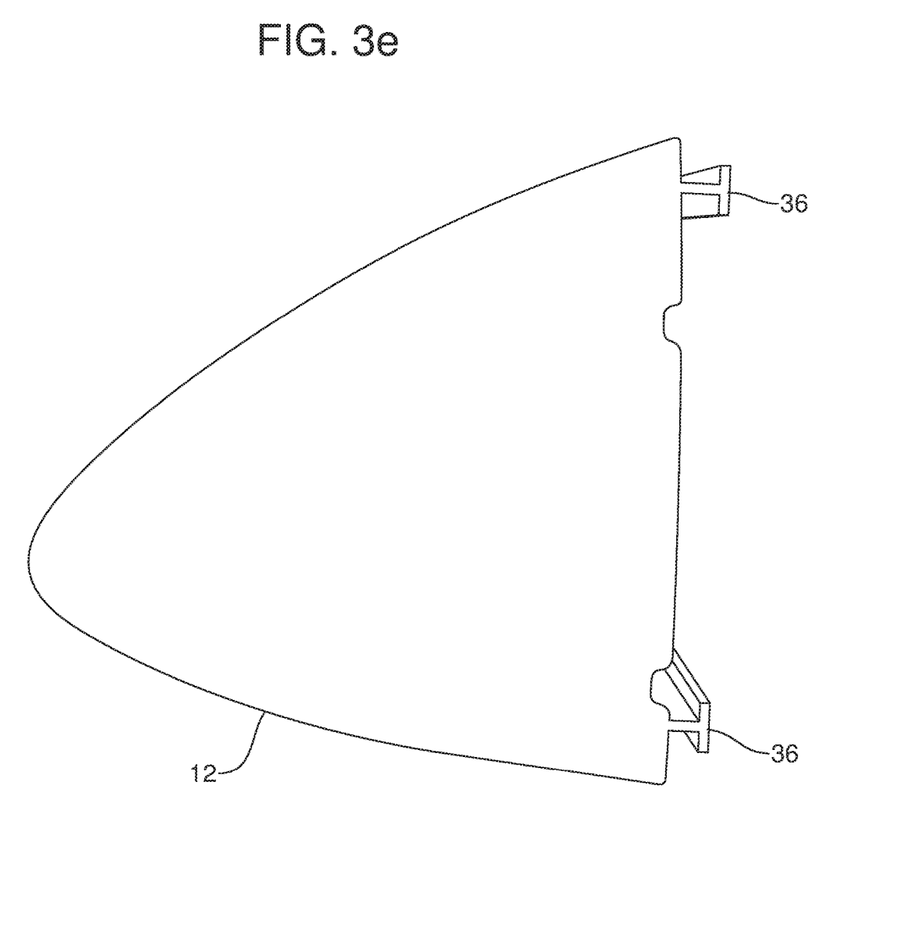
FIG. 3e is a bottom plan view of the first spoiler.

Reference is now made to FIGS. 3a-3e which are detailed side views of the first tire spoiler 12. As illustrated, a first support 32 is provided for the first tire spoiler 12. The first support 32 includes a first guide track which, in the illustrated embodiment, comprises two first elongated channels 34 having first T-shaped cross sections. The first spoiler 12 includes two cooperating first followers 36, each having a second T-shaped cross section, configured to be received and smoothly slide within one of the first guide track/first elongated channel 34. As illustrated in FIG. 3d, the first tire spoiler 12 also includes two guide features or ribs 37 at the end substantially opposite the two first followers 36. These ribs 37 about the first support 32 and abut the first support 32 and help promote free sliding movement of the first spoiler 12 with respect to the first support 32.

As further illustrated in FIG. 3a, the first actuator 18 includes a first rotary drive motor 38 which may be mounted to the first support 32. In addition, the first actuator 18 includes a first jack screw 40 that is rotated by the first rotary drive motor 38 and a first nut 42 that engages the first jack screw and is fixed to the first tire spoiler 12. The first rotary drive motor 38 of the first actuator 18 is driven to raise and lower the first tire spoiler 12 between the stowed position illustrated in FIGS. 2b and 3b and the deployed position illustrated in FIGS. 2a and 3a. As illustrated in FIGS. 3c and 3d, the first spoiler 12 is a three dimensional air deflector having a shape substantially corresponding to a front portion of an air foil.

Figure 4A:
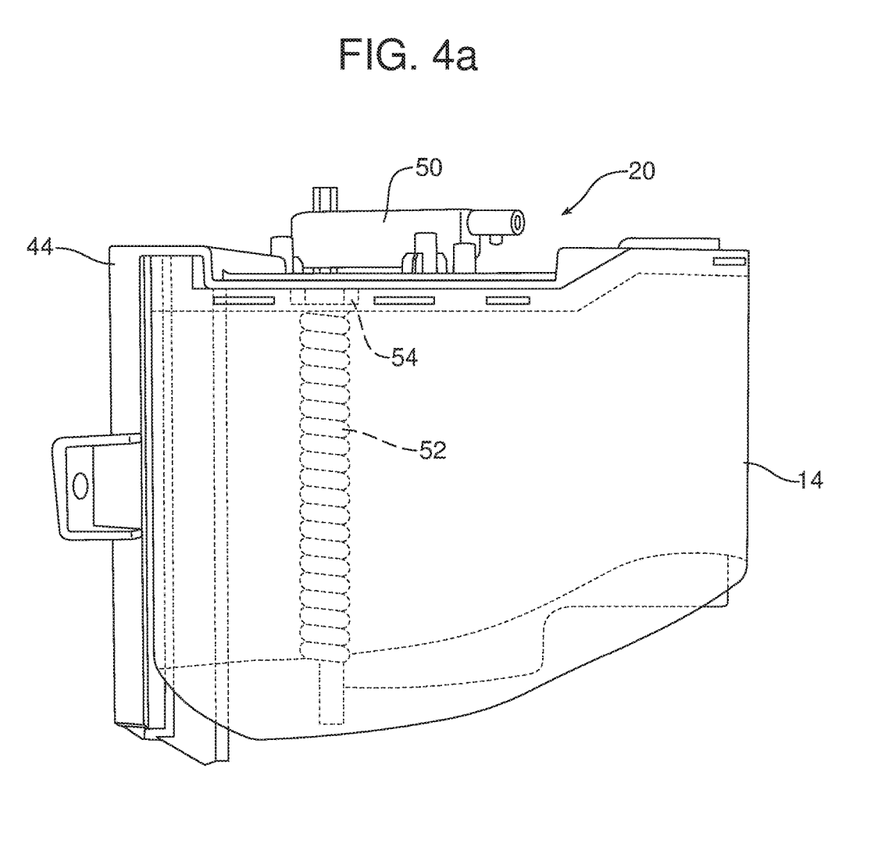
FIG. 4a is a detailed side elevational view of the second tire spoiler in the raised or stowed position.
Figure 4B:
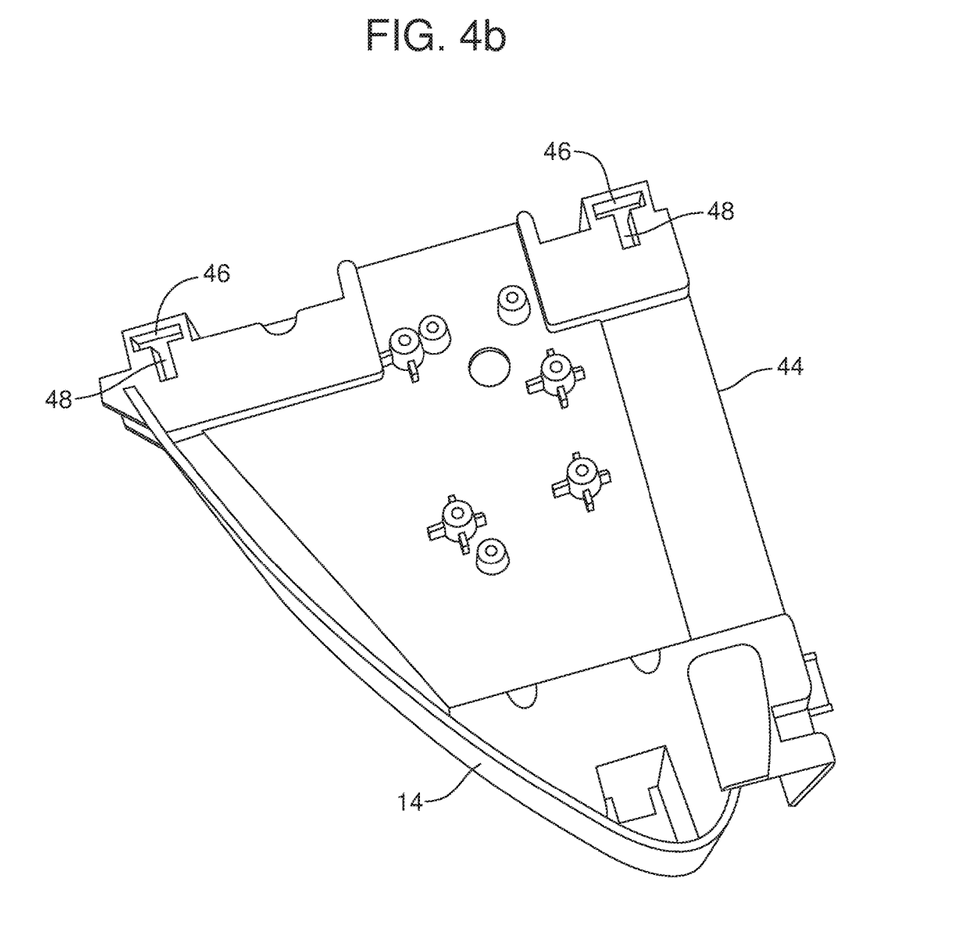
FIG. 4b is a detailed top perspective view of the second tire spoiler showing the second guide track.

As illustrated in FIGS. 4a and 4b, the active tire spoiler system 10 also includes a second support 44 which carries a second guide track, which in the illustrated embodiment, is two second elongated channels 46 integrally formed in the second support and each having a second T-shaped cross section. Two cooperating second followers 48 are provided on the second tire spoiler 14. Each of the second followers 48 has a second T-shaped cross section sized and shaped to engage in and slide along one of the two second guide track/elongated channels 46.

As best illustrated in FIG. 4a, the second actuator 20 includes a second rotary drive motor 50 that may be mounted or fixed to the second support 44. The second actuator 20 also includes a second jack screw 52 that is rotated by the second rotary drive motor 50 and a second nut 54 that engages the second jack screw and is fixed to the second tire spoiler 14.

The controller 22 may be configured to (a) include a first data input 56 to receive motor vehicle speed data from a motor vehicle speed monitoring device 58 of substantially any type known in the art. Further, the controller 22 may be configured to displace the first tire spoiler 12 and the second tire spoiler 14 into the deployed position illustrated in FIG. 2a when the motor vehicle speed data exceeds a predetermined speed such as, for example, 55 miles per hour.

As further illustrated in FIG. 1, the controller 22 may be configured to include a second data input 60 to receive ambient temperature data from an ambient temperature monitoring device of substantially any type known in the art. Further, the controller 22 may be configured to disable displacement of the first tire spoiler 12 and the second tire spoiler 14 into the deployed position when the ambient temperature data falls within a predetermined temperature range. Thus, the controller 22 maintains the first tire spoiler 12 and second tire spoiler 14 in the stowed position illustrated in FIGS. 2b, 3a and 4a to prevent potential freezing of the first and second tire spoilers in the downwardly extended or deployed position when the motor vehicle is subjected to inclement winter weather conditions. For example, the predetermined temperature range may be a temperature less than 34 degrees, a temperature between 28 and 34 degrees Fahrenheit or other appropriate setting.

As further illustrated in FIG. 1, the controller 22 may be configured to include a third data input 64 for receiving drive train mode status data from a drive train mode status monitoring device 66 of substantially any type known in the art. Thus, for example, when the operator of the motor vehicle has placed the motor vehicle drive train in four-by-four drive mode for off-road operation, the controller 22 may be configured to prevent displacement of the first tire spoiler 12 and second tire spoiler 14 into the deployed position regardless of the speed of operation of the motor vehicle.

As further appreciated, the controller 22 may also be configured to include a timer 68. The timer 68 may be utilized by the controller 22 in a determination of when to displace the first tire spoiler 12 and second tire spoiler 14 from the deployed position to the stowed position or from the stowed position to the deployed position. For example, when data received from the motor vehicle speed monitoring device 58 at the first data input 56 indicates that the motor vehicle is being driven at a speed of less than 72 kilometers per hour for a duration of 15 seconds or more as indicated by the timer 68, the controller may be configured to displace the first tire spoiler 12 and second tire spoiler 14 to the stowed position. In contrast, when the monitored motor vehicle speed is greater than 88 kilometers per hour for a time of 15 seconds or more, the controller may be configured to displace the first tire spoiler 12 and second tire spoiler 14 from the stowed position to the deployed position.

Consistent with the above description, a method is provided for controlling active tire spoilers 12, 14 of a motor vehicle. That method may be broadly described as comprising the steps of: (a) monitoring, by a speed monitoring device 58, motor vehicle speed and (b) controlling, by a control module 16, displacement of a first tire spoiler 12 and a second tire spoiler 14 between a stowed position and a deployed position in response to a current speed of the motor vehicle.

The method may further include the step of monitoring ambient temperature by means of a temperature monitoring device 62. In addition, the method may include the step of disabling, by the controller 22, displacement of the first tire spoiler 12 and the second tire spoiler 14 into the deployed position in response to a current temperature falling within a predetermined range or below a predetermined value.

Further, the method may include the step of monitoring, by a drive train mode status monitoring device 66, a drive train mode status of the motor vehicle. Further, the method may include the step of disabling, by the controller 22, displacement of the first tire spoiler 12 and the second tire spoiler 14 into the deployed position in response to a current drive train mode status indicating engagement of the drive train in four-by-four drive mode.

Still further, the method may include the step of configuring the controller 22 to include a timer 68. Further, the method may include configuring the controller 22 to displace the first tire spoiler 12 and the second tire spoiler 14 into the stowed position in response to the motor vehicle being operated at a speed below a predetermined speed for a predetermined period of time. Alternatively or in addition, the method may include the step of configuring the controller 22 to displace the first tire spoiler 12 and the second tire spoiler 14 into the deployed position in response to the motor vehicle being operated at a speed above a predetermined speed for a predetermined period of time.

The foregoing has been presented for purposes of illustration and description. It is not intended to be exhaustive or to limit the embodiments to the precise form disclosed. Obvious modifications and variations are possible in light of the above teachings. For example, the predetermined temperature or temperature range, the predetermined speed and the predetermined timeframe described above for the illustrated embodiment may be altered as desired for any particular motor vehicle equipped with the active tire spoiler system 10. All such modifications and variations are within the scope of the appended claims when interpreted in accordance with the breadth to which they are fairly, legally and equitably entitled.

What is claimed:

1. An active tire spoiler system, comprising:
   a first tire spoiler;
   a second tire spoiler; and
   a control module including a controller configured to displace said first tire spoiler and said second tire spoiler between a stowed position and a deployed position, wherein said control module includes a first actuator connected to said first tire spoiler and a second actuator connected to said second tire spoiler, wherein said first actuator includes a first rotary drive motor, a first jack screw rotated by said first rotary drive motor and a first nut engaged with said first jack screw and fixed to said first tire spoiler, and wherein said second actuator includes a second rotary drive motor, a second jack screw rotated by said second rotary drive motor and a second nut engaged with said second jack screw and fixed to said second tire spoiler.

2. The active tire spoiler system of claim 1, further including a first support for said first tire spoiler and a second support for said second tire spoiler.

3. The active tire spoiler system of claim 2, wherein said first support includes a first guide track and said second support includes a second guide track.

4. The active tire spoiler system of claim 3, further including a first follower on said first tire spoiler and a second follower on said second tire spoiler.

5. The active tire spoiler system of claim 4, wherein said first rotary drive motor is carried on said first support and said second rotary drive motor is carried on said second support.

6. The active tire spoiler system of claim 5, wherein said first guide track is a first elongated channel having a first T-shaped cross section and said second guide track is a second elongated channel having a second T-shaped cross section.

7. The active tire spoiler system of claim 4, wherein said controller is configured to (a) include a first data input for motor vehicle speed data and (b) displace said first tire spoiler and said second tire spoiler into said deployed position when said motor vehicle speed data exceeds a predetermined speed.

8. The active tire spoiler system of claim 7, wherein said controller is configured to (a) include a second data input for ambient temperature data and (b) disable displacement of said first tire spoiler and said second tire spoiler to said deployed position when said ambient temperature data falls within a predetermined temperature range.

9. The active tire spoiler system of claim 8, wherein said controller is configured to include a third data input for drive train mode status data.

* * * * *